(12) United States Patent
Von Novak, III et al.

(10) Patent No.: US 10,224,753 B2
(45) Date of Patent: Mar. 5, 2019

(54) WIRELESS POWER TRANSFER USING A FIELD ALTERING CIRCUIT

(71) Applicant: QUALCOMM Incorporated, San Diego, CA (US)

(72) Inventors: William Henry Von Novak, III, San Diego, CA (US); Edward Kenneth Kallal, San Diego, CA (US); Cody Burton Wheeland, San Diego, CA (US); Seong Heon Jeong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 15/075,344

(22) Filed: Mar. 21, 2016

(65) Prior Publication Data

US 2016/0352147 A1    Dec. 1, 2016

Related U.S. Application Data

(60) Provisional application No. 62/166,819, filed on May 27, 2015.

(51) Int. Cl.
| | |
|---|---|
| *H01F 27/42* | (2006.01) |
| *H01F 37/00* | (2006.01) |
| *H01F 38/00* | (2006.01) |
| *H02J 50/12* | (2016.01) |
| *H02J 50/80* | (2016.01) |
| *H02J 7/02* | (2016.01) |
| *B60L 11/18* | (2006.01) |
| *H02J 5/00* | (2016.01) |

(52) U.S. Cl.
CPC ............ *H02J 50/12* (2016.02); *B60L 11/182* (2013.01); *H02J 5/005* (2013.01); *H02J 7/025* (2013.01); *H02J 50/80* (2016.02); *Y02T 10/7005* (2013.01); *Y02T 10/7072* (2013.01); *Y02T 90/122* (2013.01); *Y02T 90/14* (2013.01)

(58) Field of Classification Search
CPC . H02J 5/005; H02J 7/025; H02J 17/00; H01F 38/14; B60L 11/182
USPC ......................................................... 307/104
See application file for complete search history.

(56) References Cited

U.S. PATENT DOCUMENTS

| | | |
|---|---|---|
| 8,934,857 B2 | 1/2015 | Low et al. |
| 9,620,986 B2 | 4/2017 | Von Novak, III et al. |
| 2008/0266748 A1 | 10/2008 | Lee |
| 2010/0033021 A1* | 2/2010 | Bennett ................... H02J 17/00 307/104 |

(Continued)

OTHER PUBLICATIONS

International Search Report and Written Opinion—PCT/US2016/029672—ISA/EPO—dated Jun. 22, 2016.

*Primary Examiner* — Anh Q Tra

(74) *Attorney, Agent, or Firm* — Smith Tempel Blaha LLC

(57) ABSTRACT

A wireless power transmitter includes a power transmit coil configured to generate a magnetic field for wirelessly coupling charging power to one or more receiver devices, the magnetic field having a magnetic field distribution over an area defining a charging region, a circuit configured to alter the magnetic field generated by the power transmit coil to alter the magnetic field distribution, and a controller operably coupled to the circuit, the controller configured to control the circuit to alter the magnetic field distribution responsive to a detected characteristic of the one or more receiver devices.

24 Claims, 15 Drawing Sheets

(56) References Cited

U.S. PATENT DOCUMENTS

| | | | |
|---|---|---|---|
| 2010/0244580 A1* | 9/2010 | Uchida | H02J 5/005 307/104 |
| 2010/0259217 A1 | 10/2010 | Baarman et al. | |
| 2011/0133569 A1* | 6/2011 | Cheon | H02J 17/00 307/104 |
| 2012/0119698 A1 | 5/2012 | Karalis et al. | |
| 2012/0156425 A1* | 6/2012 | D'Amario | F16H 55/02 428/119 |
| 2012/0161539 A1* | 6/2012 | Kim | H02J 17/00 307/104 |
| 2012/0293005 A1 | 11/2012 | Ryu et al. | |
| 2014/0125275 A1 | 5/2014 | Low et al. | |
| 2014/0183972 A1* | 7/2014 | Endo | H02J 17/00 307/104 |
| 2014/0252868 A1 | 9/2014 | Yamada et al. | |
| 2014/0361628 A1* | 12/2014 | Huang | H01F 38/14 307/104 |
| 2015/0042429 A1 | 2/2015 | Lee | |
| 2015/0091379 A1* | 4/2015 | Uchida | H02J 5/005 307/11 |
| 2015/0115727 A1 | 4/2015 | Carobolante et al. | |
| 2016/0329748 A1 | 11/2016 | White, II et al. | |
| 2016/0359337 A1* | 12/2016 | Von Novak, III | H02J 50/12 |
| 2017/0005481 A1 | 1/2017 | Von Novak, III et al. | |
| 2017/0126071 A1* | 5/2017 | Aioanei | H02J 50/12 |

* cited by examiner

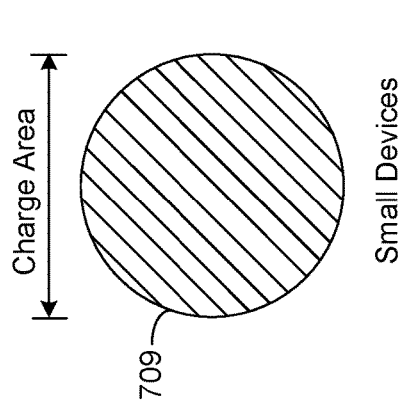
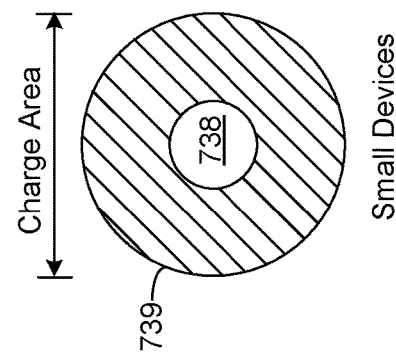
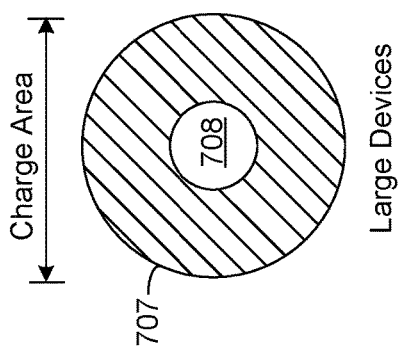
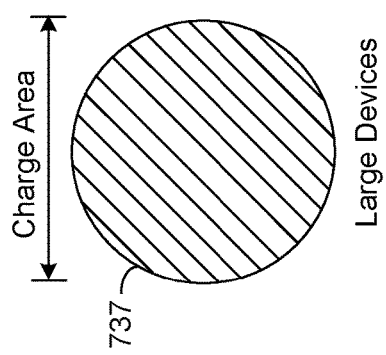
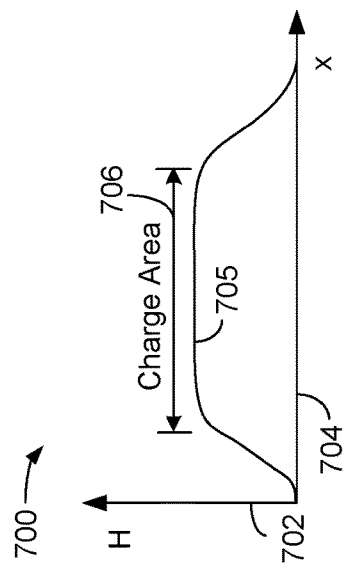
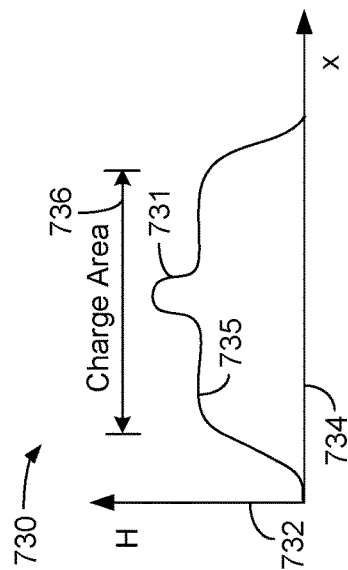
FIG. 7A
FIG. 7B

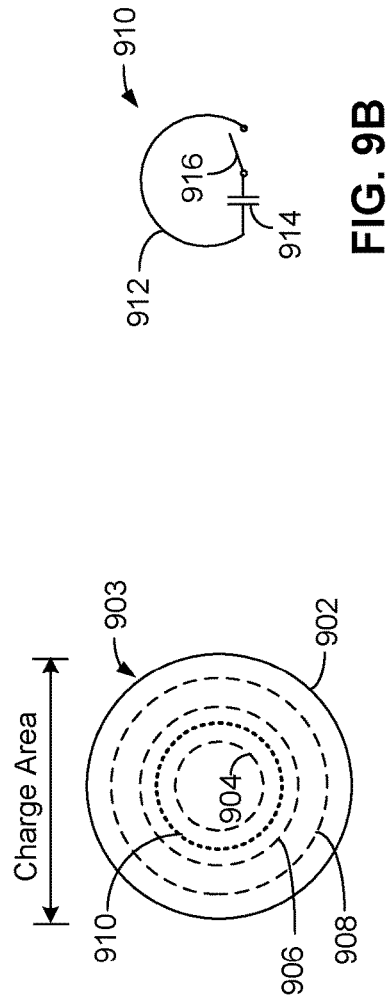
FIG. 9A
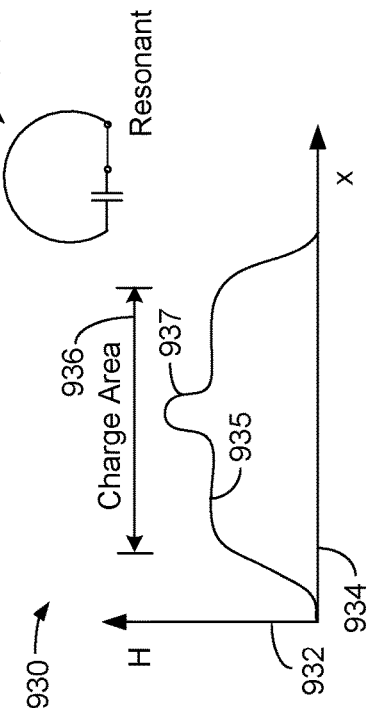
FIG. 9B
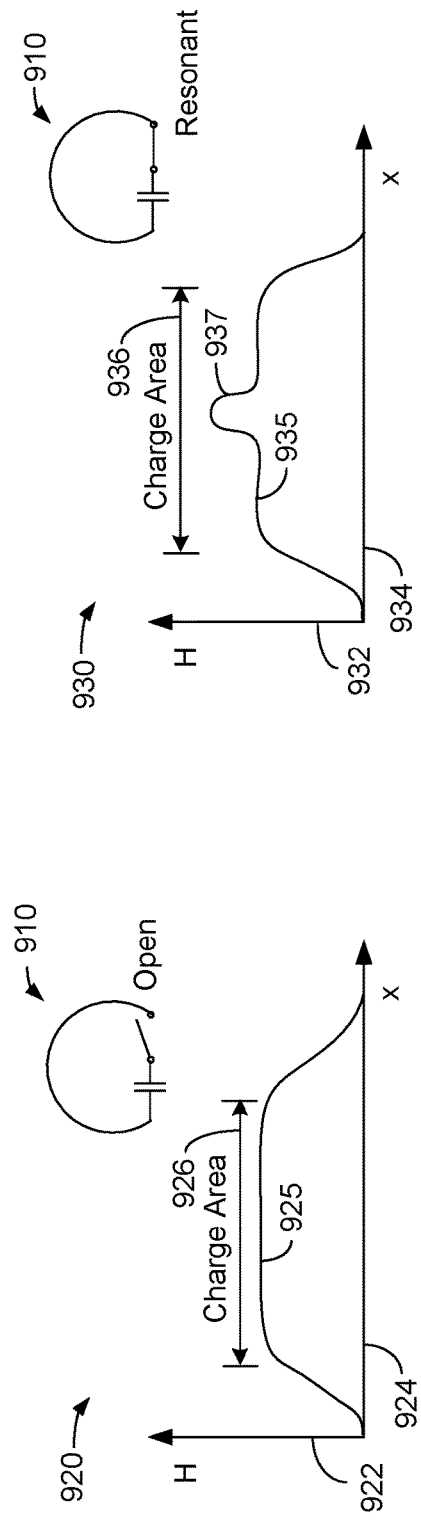
FIG. 9C
FIG. 9D

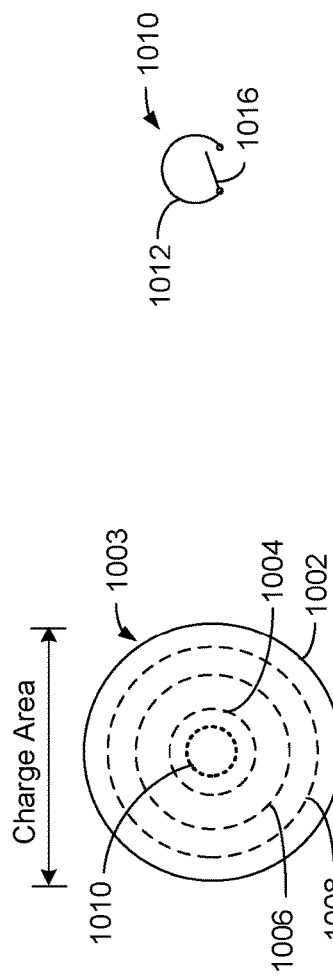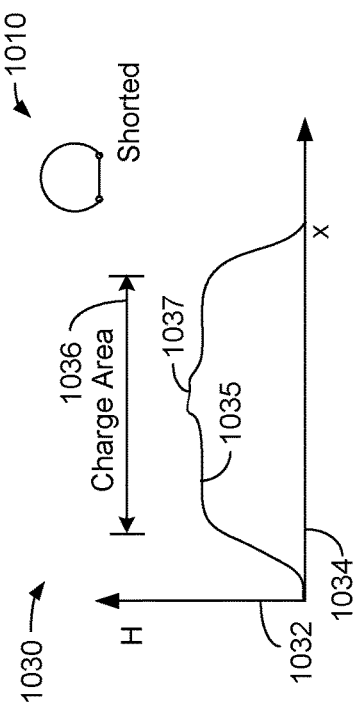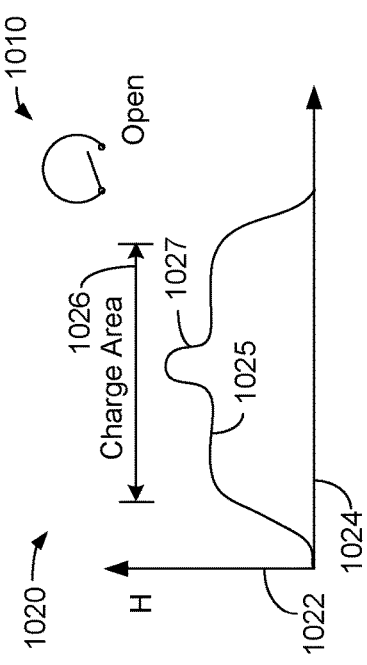
FIG. 10A
FIG. 10B
FIG. 10C
FIG. 10D

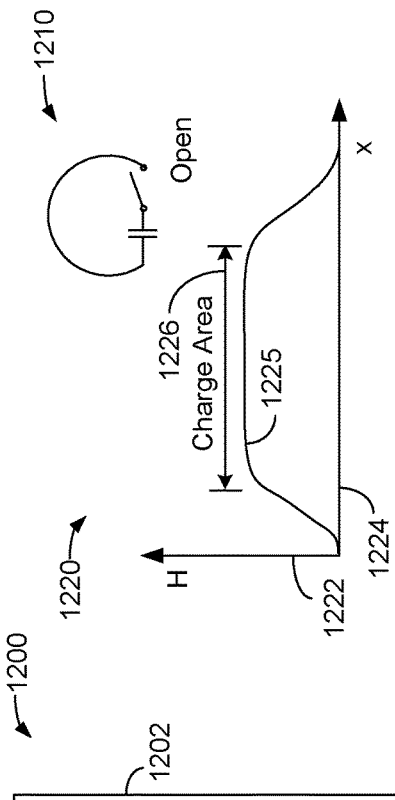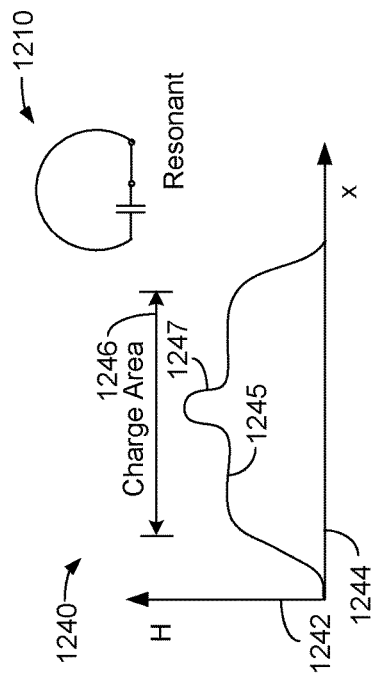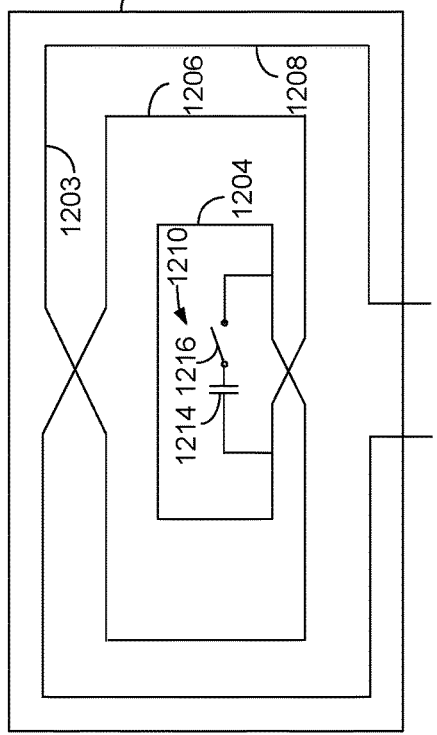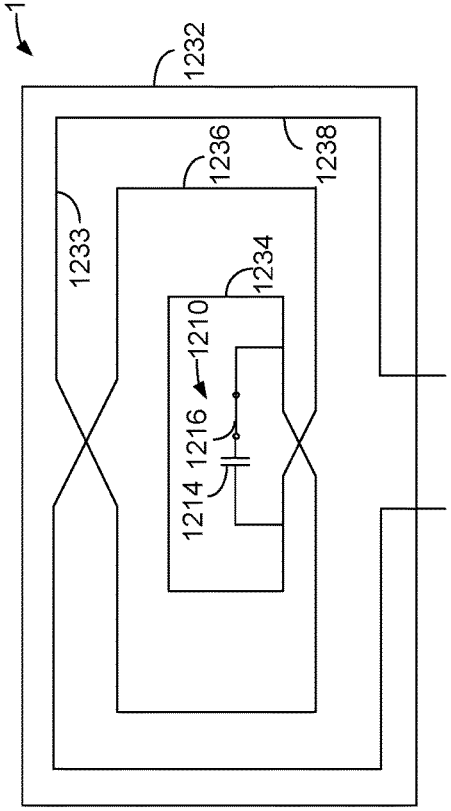
FIG. 12A
FIG. 12B
FIG. 12C
FIG. 12D

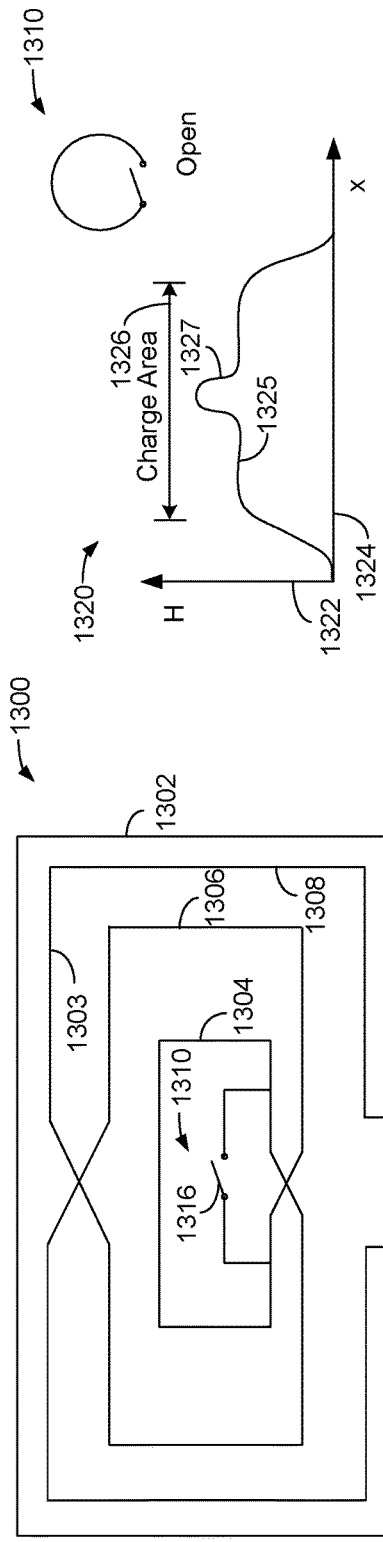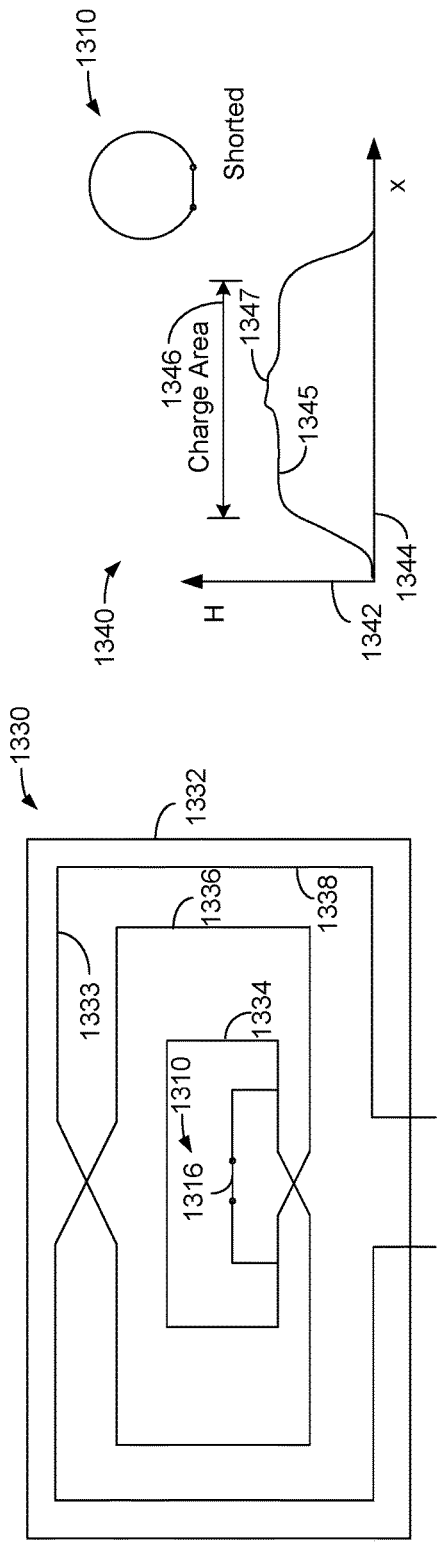
FIG. 13A
FIG. 13B
FIG. 13C
FIG. 13D

WIRELESS POWER TRANSFER USING A FIELD ALTERING CIRCUIT

RELATED APPLICATIONS

This application claims the benefit of U.S. Provisional Patent Application No. 62/166,819, entitled "Wireless Power Transfer Using A Field Altering Circuit," filed May 27, 2015, the contents of which are hereby incorporated by reference in their entirety.

FIELD

The present disclosure relates generally to wireless power. More specifically, the disclosure is directed to a field altering coil.

DESCRIPTION OF THE RELATED ART

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless power transmitter including a power transmit coil configured to generate a magnetic field for wirelessly coupling charging power to one or more receiver devices, the magnetic field having a magnetic field distribution over an area defining a charging region, a circuit configured to alter the magnetic field generated by the power transmit coil to alter the magnetic field distribution, and a controller operably coupled to the circuit, the controller configured to control the circuit to alter the magnetic field distribution responsive to a detected characteristic of the one or more receiver devices.

Another aspect of the disclosure provides a device for generating a magnetic field having a magnetic field distribution over an area defining a charging region for wirelessly charging or powering one or more receiver devices including means for detecting a characteristic of one or more receiver devices indicative of an amount or efficiency of wirelessly coupling charging power via the magnetic field generated by the wireless power transmitter apparatus, and means for altering the magnetic field to alter the magnetic field distribution within the charging region in response to the detecting means.

Another aspect of the disclosure provides a method of operating a wireless power transmitter apparatus configured to generate a magnetic field having a magnetic field distribution over an area defining a charging region for wirelessly charging or powering one or more receiver devices, the method including detecting a characteristic of one or more receiver devices indicative of an amount or efficiency of wirelessly coupling charging power via the magnetic field generated by the wireless power transmitter apparatus, and altering the magnetic field to alter the magnetic field distribution within the charging region in response to detecting the characteristic.

Another aspect of the disclosure provides an apparatus for wireless power transfer including a housing having a surface configured for direct or indirect placement of one or more receiver devices, the surface defining a charging region for wirelessly charging the one or more receiver devices, a power transmit coil configured to generate a magnetic field within the charging region for wirelessly coupling charging power to one or more receiver devices, the magnetic field having a magnetic field distribution within the charging region, and a circuit configured to alter the magnetic field generated by the power transmit coil to alter the magnetic field distribution within the charging region.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 7A is a diagram illustrating a field distribution of a transmit antenna having an even H-field.

FIG. 7B is a diagram illustrating a field distribution of a transmit antenna having an H-field with a peak.

FIGS. 9A, 9B, 9C and 9D are diagrams illustrating an embodiment of a wireless power transfer antenna incorporating a field altering circuit, where the field altering circuit is a field concentrator circuit.

FIGS. 10A, 10B, 10C and 10D are diagrams illustrating an embodiment of a wireless power transfer antenna incorporating a field altering circuit, where the field altering circuit is a field attenuator circuit.

FIGS. 12A, 12B, 12C and 12D are diagrams illustrating an alternative embodiment of a wireless power transfer antenna incorporating a field altering circuit, where the field altering circuit can be a field concentrator circuit.

FIGS. 13A, 13B, 13C and 13D are diagrams illustrating an alternative embodiment of a wireless power transfer antenna incorporating a field altering circuit, where the field altering circuit can be a field attenuator circuit.

Figure 1:
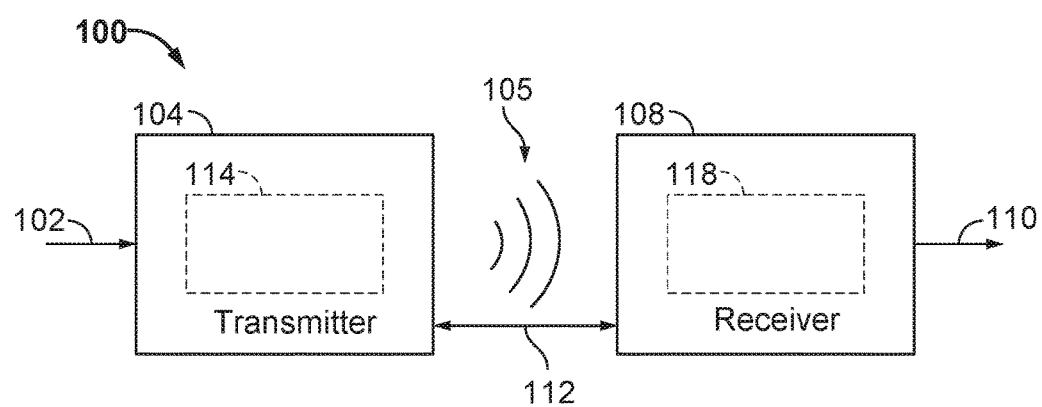
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

It is desirable to have a wireless charger that can wirelessly charge a variety of devices that may have attributes that make one type of charging field distribution preferable over another type of charging field distribution. For example, one device may be better adapted to receive power wirelessly from an even charging field distribution, while another device may be better adapted to receive power wirelessly from a peaky charging field distribution.

FIG. 1 is a functional block diagram of an exemplary wireless power transfer system 100, in accordance with exemplary embodiments of the invention. Input power 102 may be provided to a transmitter 104 from a power source (not shown) for generating a field 105 (e.g., magnetic or species of electromagnetic) for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are reduced. As such, wireless power transfer may be provided over larger distances in contrast to purely inductive solutions that may require large coils to be very close (e.g., millimeters). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 108. In some cases, the field 105 may correspond to the "near-field" of the transmitter 104 as will be further described below. The transmitter 104 may include a transmit antenna 114 (that may also be referred to herein as a coil) for outputting an energy transmission. The receiver 108 further includes a receive antenna 118 (that may also be referred to herein as a coil) for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114.

In accordance with the above therefore, in accordance with more particular embodiments, the transmitter 104 may be configured to output a time varying magnetic field 105 with a frequency corresponding to the resonant frequency of the transmit antenna 114. When the receiver is within the field 105, the time varying magnetic field may induce a voltage in the receive antenna 118 that causes an electrical current to flow through the receive antenna 118. As described above, if the receive antenna 118 is configured to be resonant at the frequency of the transmit antenna 114, energy may be efficiently transferred. The AC signal induced in the receive antenna 118 may be rectified as described above to produce a DC signal that may be provided to charge or to power a load.

Figure 2:
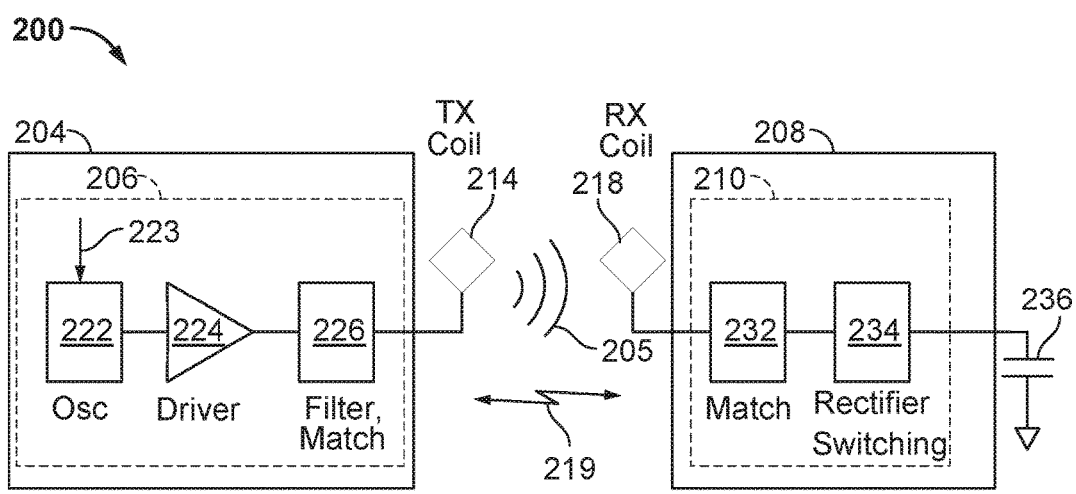
FIG. 2 is a functional block diagram of exemplary components that may be used in the wireless power transfer system of FIG. 1, in accordance with various exemplary embodiments of the invention.

FIG. 2 is a functional block diagram of a wireless power transfer system 200 that includes exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the impedance of the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts or 5 Watts to 40 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 208. The matching circuit 232 may be included to match the impedance of the receive circuitry 210 to the impedance of the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 205.

The receiver 208 may initially have a selectively disablable associated load (e.g., battery 236), and may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate.

Figure 3:
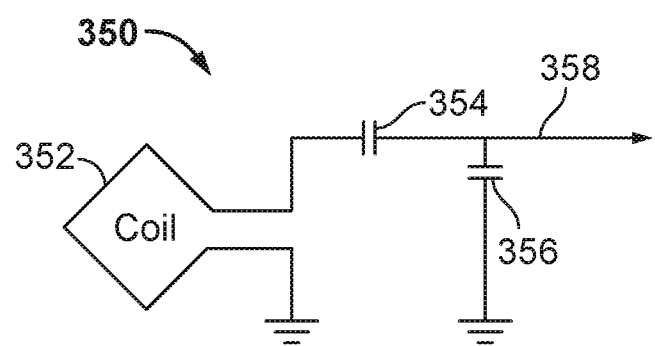
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown).

The antenna 352 may form a portion of a resonant circuit configured to resonate at a resonant frequency. The resonant frequency of the loop or magnetic antenna 352 is based on the inductance and capacitance. Inductance may be simply the inductance created by the antenna 352, whereas, capacitance may be added to create a resonant structure (e.g., a capacitor may be electrically connected to the antenna 352 in series or in parallel) at a desired resonant frequency. As a non-limiting example, capacitor 354 and capacitor 356 may be added to the transmit or receive circuitry 350 to create a resonant circuit that resonates at a desired frequency of operation. For larger diameter antennas, the size of capacitance needed to sustain resonance may decrease as the diameter or inductance of the loop increases. As the diameter of the antenna increases, the efficient energy transfer area of the near-field may increase. Other resonant circuits formed using other components are also possible. As another non-limiting example, a capacitor (not shown) may be placed in parallel between the two terminals of the antenna 352. For transmit antennas, a signal 358 with a frequency that substantially corresponds to the resonant frequency of the antenna 352 may be an input to the antenna 352. For receive antennas, the signal 358 may be the output that may be rectified and used to power or charge a load.

Figure 4:
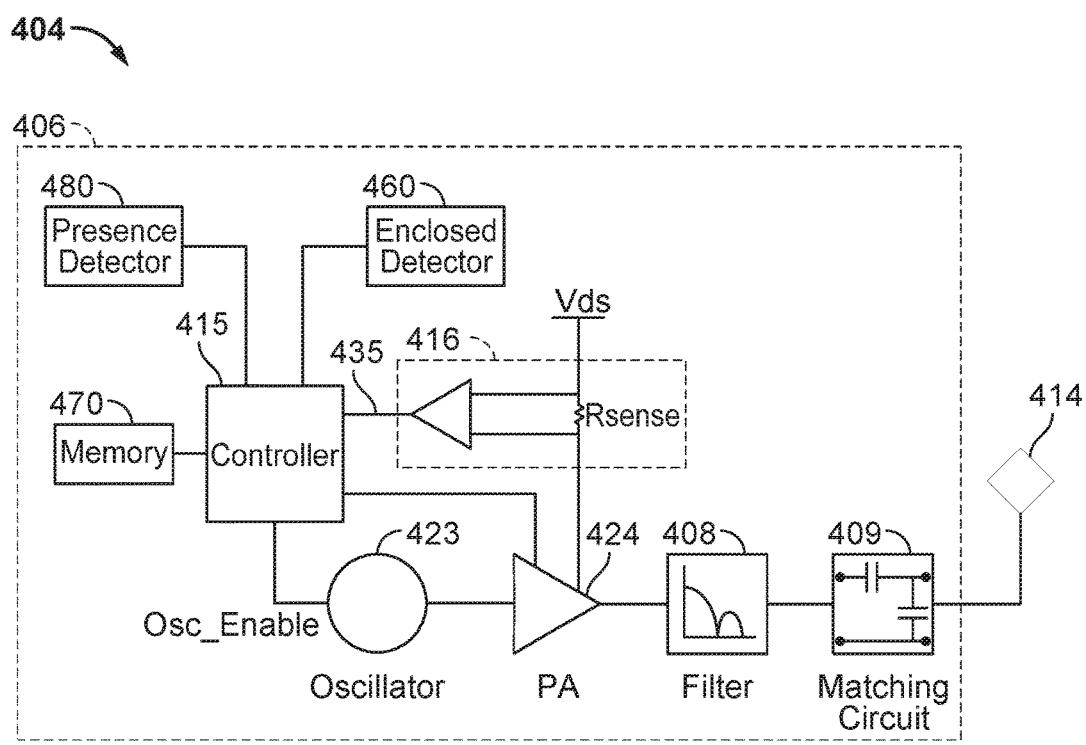
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. The transmit antenna 414 may be configured as the transmit antenna 214 as described above in reference to FIG. 2. In some implementations, the transmit antenna 414 may be a power transmit coil (e.g., an induction coil). In some implementations, the transmit antenna 414 may be associated with a larger structure, such as a pad, table, mat, lamp, or other stationary configuration. Transmit circuitry 406 may provide power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive a signal as determined by an oscillator 423. The transmit circuitry 406 may be comprised of discrete devices or circuits, or alternately, may be comprised of an integrated assembly.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as a processor. The controller 415 may be coupled to a memory 470. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver.

The transmit antenna 414 may be implemented with a Litz wire or as an antenna strip with the thickness, width and metal type selected to keep resistive losses low.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the power received by the device may be used to toggle a switch on the receiver device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
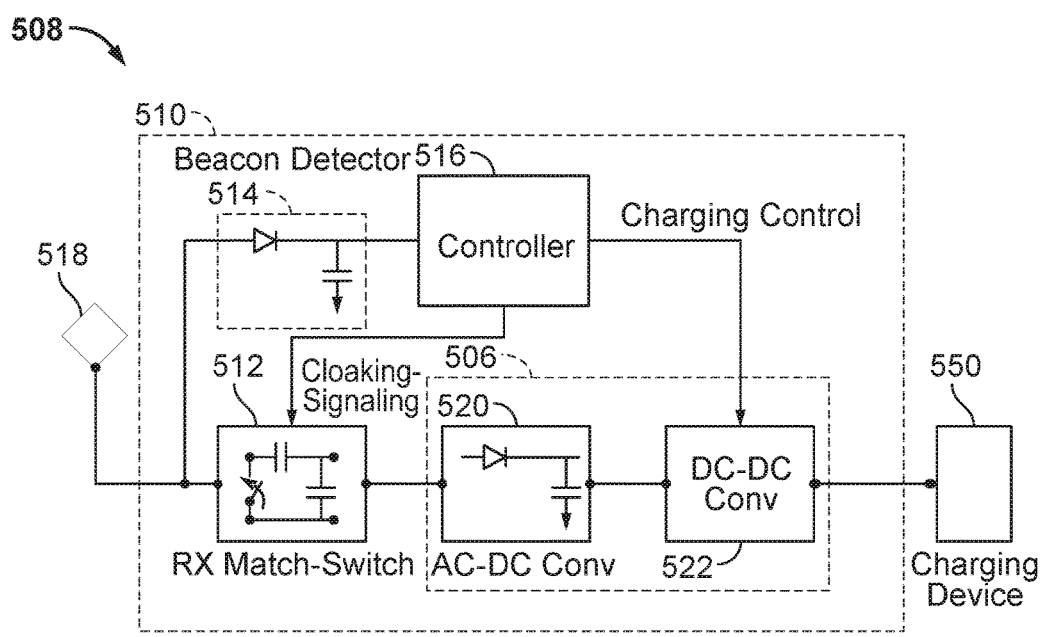
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (and other medical devices), wearable devices, and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received energy into charging power for use by the device 550. Power conversion circuitry 506 includes an AC-to-DC converter 520 and may also include a DC-to-DC converter 522. AC-to-DC converter 520 rectifies the energy signal received at receive antenna 518 into a non-alternating power with an output voltage. The DC-to-DC converter 522 (or other power regulator) converts the rectified RF energy signal into an energy potential (e.g., voltage) that is compatible with device 550 with an output voltage and output current. Various AC-to-DC converters are contemplated, including partial and full rectifiers, regulators, bridges, doublers, as well as linear and switching converters.

Receive circuitry 510 may further include RX matching and switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 may take place either via an "out-of-band" separate communication channel/antenna or via "in-band" communication that may occur via modulation of the field used for power transfer.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced signal energy into a nominal power for awakening either un-powered or power-depleted circuits within receive circuitry 510 in order to configure receive circuitry 510 for wireless charging.

Receive circuitry 510 further includes controller 516 for coordinating the processes of receiver 508 described herein including the control of switching circuitry 512 described herein. It is noted that the controller 516 may also be referred to herein as a processor. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
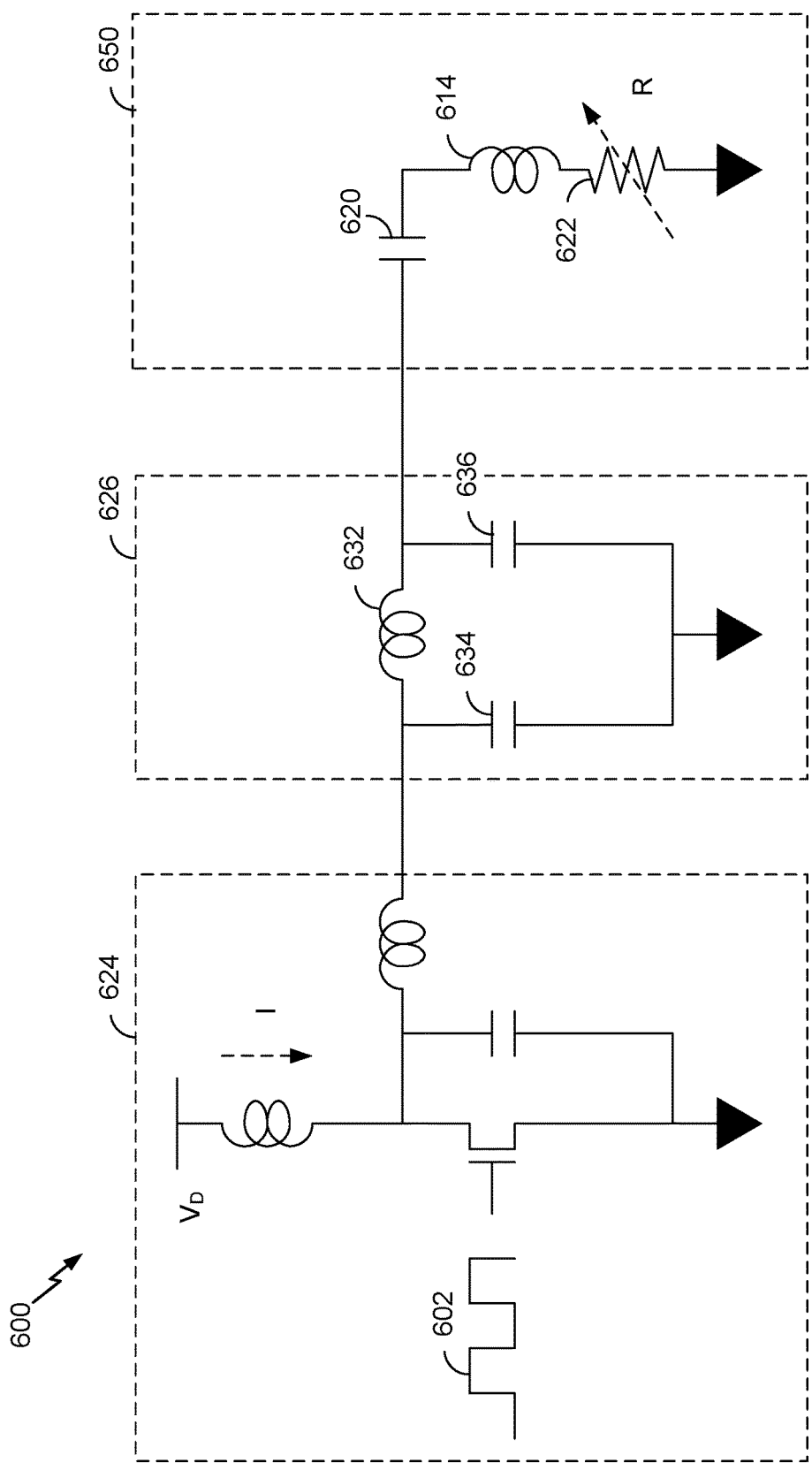
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Wireless charging systems produce magnetic charging fields having different H-field distribution. An "even" H-field is one that has a relatively constant field distribution over its charge area. An "even" H-field distribution may be better suited to small charge receiving devices, and charge receiving devices that do not have large metal plates in the vicinity of the receive resonator. A "peaky" H-field is one that has a varying field distribution over its charge area with an H-field "peak" typically located in the center of an antenna or a coil, which may also be a resonator. A "peaky" H-field distribution may be better suited to larger charge receiving devices that may have a relatively small antenna and a large metal plate in the vicinity of the receive antenna. For most charge receiving devices, an even H-Field may provide various advantages. For these devices, an even H-field provides constant open circuit voltages that allow for the placement of a charge receiving device anywhere on a charging pad, thus simplifying the design of a power receiving unit (PRU) in the charge receiving device. However, for a charge receiving device having a relatively small antenna, or coil with a large metal plate or backing, a "peaky" H-field may provide various advantages, with the highest portion of the H-field located in the center of the charging pad. In this manner, when a larger PRU is placed in the center of the charging pad, the "peak" of the field compensates for the reduction in coupling caused by the opposing field resulting from the H-field coupling to the large metal plate or cover in the vicinity of the receiver's resonator or coil. Unfortunately, because it is likely that most charge receiving devices will be placed in the center of a charging pad, it is difficult to provide suitable charging power to all devices, some of which are better suited to an "even" H-field charge distribution and others that are better suited to a "peaky" H-field charge distribution. Therefore, it is desirable to have the ability to provide an H-field distribution for a wireless charging system that may be suited to all types of charge-receiving devices.

FIG. 7A is a diagram illustrating a field distribution of a transmit antenna having an even H-field. The graph 700 illustrates relative H-field strength over area. The vertical axis 702 shows the relative magnitude of an H-field produced by a power transmit antenna, and the horizontal axis 704 shows the distance, x, across the power transmit antenna. The trace 705 shows the relative magnitude of the H-field across the power transmit antenna. The shape of the trace 705 gives rise to a "charge area" 706 that covers the surface of a wireless power transmit pad. The H-field produced in the charging area at any location is a complex 3D vector having a magnitude and phase. For simplicity of description, the H-field will be referred to herein as having a relative magnitude, while recognizing that phase is also present in the 3D vector.

The cross-hatched areas of the transmit pad 707 illustrate the charging areas for charging a relatively large device having a small resonator coil and a metal plate or cover, such as a device configured to draw between approximately 10 and 20 watts, such as a tablet computing device. When a relatively large device with a small resonator coil and a metal plate or cover is placed on the surface of the charging pad 707, the metal plate or cover reduces the electromagnetic coupling of charging energy from the transmit pad 707 to the device so as to create a charging null toward the center of the transmit pad 707. This may occur due to the metal plate coupling to the "reverse" field present outside the charging area. This may occur in generally two different situations. In a first situation, a relatively large receiver with a relatively large metal plate and relatively small receive coil is located on a charger or charging surface that is larger than the metal plate in the receiver. In this case, eddy currents created in the metal plate oppose the field received by the receive coil and coupling and voltage at the receiver is reduced. This potentially leads to a coverage hole where the receiver device does not receive enough voltage to operate normally. In a second situation, a relatively large receiver with a relatively large metal plate and relatively small receive coil is located on a charger or charging surface that is smaller than the metal plate in the receiver. In this case, the reverse field present outside the charger couples to the smaller receive coil and reinforces the H-field there such that coupling and voltage at the receiver increases, possibly leading to receiver damage from over-charging. The present disclosure generally addresses the first situation where eddy currents created in the metal plate oppose the field received by the receive coil and coupling and voltage at the receiver is reduced. This unwanted coupling causes the coupling of energy shown by the trace 705 to diminish or become attenuated in the center 708 of the charging pad 707.

The cross-hatched areas of the transmit pad 709 illustrate the charging areas for charging a relatively small device, with little or no metal plate or cover, such as a device configured to draw between approximately a few milliWatts and 10 watts, such as a wireless headset or a smart phone. When a relatively small device is placed on the surface of the charging pad 709, the even H-field is generally maintained across the entire surface of the transmit pad 709, and allows the relatively small device to be placed anywhere on the surface of the transmit pad 709 and still receive adequate charging energy.

FIG. 7B is a diagram illustrating a field distribution of a transmit antenna having an H-field with a peak. The graph 730 illustrates relative H-field strength over area. The vertical axis 732 shows the relative magnitude of an H-field produced by a power transmit antenna, and the horizontal axis 734 shows the distance, x, across the power transmit antenna. The trace 735 shows the relative magnitude of the H-field across the transmit antenna and includes a "peak" 731. The shape of the trace 735 also gives rise to a "charge area" 736 that covers the surface of a wireless power transmit pad.

The cross-hatched areas of the transmit pad 737 illustrate the charge areas for charging a relatively large device having a small resonator coil and a metal plate or cover. The peak 731 in the H-field is located generally in the center of the transmit pad 737 and allows the relatively large device having a small resonator coil and a metal plate or cover to be placed anywhere on the surface of the transmit pad 737 and receive adequate charging energy because the peak 731 overcomes any reduction in electromagnetic coupling caused by the overhanging metal plate or cover.

The cross-hatched areas of the transmit pad 739 illustrate the charge areas for charging a relatively small device, with little or no metal plate or cover using the peaky H-field shown in the trace 735. When a relatively small device is placed on the surface of the charging pad 739, the peaky H-field can cause the small device to receive too strong a field toward the center of the charging pad 739, which may result in overcharging of the small device or the charger shutting down due to over-voltage protection features of the small device. This makes it impractical to place the small device toward the center of the transmit pad 739 in the region 738 and still receive an adequate charge.

In an exemplary embodiment, it is desirable to have the ability to modify or adjust the transmitted H-field of a power transmit antenna so that a single charging antenna system can be used to charge a variety of devices.

Figure 8:
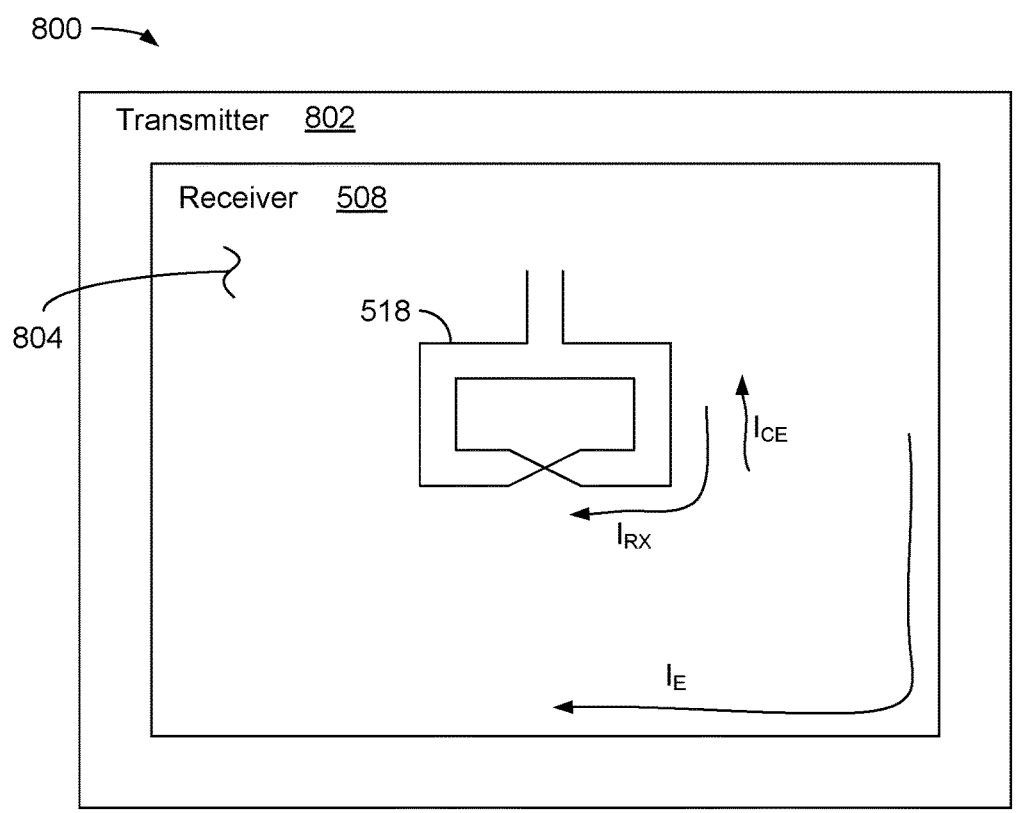
FIG. 8 is a schematic diagram showing an exemplary receiver located on a wireless charging surface.

FIG. 8 is a schematic diagram 800 showing an exemplary receiver 508 located on a wireless charging surface 802. The wireless charging surface 802 may comprise a pad, a table, a mat, a lamp, or other structure, and may comprise some or all of the elements described in the transmitter 404 of FIG. 4. In the embodiment shown in FIG. 8, the receiver 508 is smaller in area than the wireless charging surface 802. In the embodiment shown in FIG. 8, the receiver 508 comprises a primary receive antenna 518, that is relatively small compared to the size of the receiver 508. As used herein, the term "antenna" is used interchangeably with the term "coil," and, when implemented with a capacitor, may comprise a resonant structure and be referred to as a "resonator." As shown in FIG. 8, the receiver 508 comprises an enclosure or other metal structure 804 that may be large relative to the size of the primary receive antenna 518. In such an instance, the large metal plate of the metal structure 804 causes a large reactance shift, and also causes a reduction in coupling whereby the flux, referred to as eddy current, $I_E$, induced in the metal structure 804 generates a current, $I_{CE}$, in the primary receive antenna 518 that opposes the charging current, $I_{RX}$, in the primary receive antenna 518. The current, $I_{CE}$, refers to a counter eddy current that is induced in the primary receive antenna 518 by the eddy current, $I_E$. This means that electromagnetic coupling from the transmitter 404 to the receiver 508 is minimal when the receiver 508 is centered on the wireless charging surface 802, since the metal structure 804 covers the maximum area of transmit antenna (not shown in FIG. 8) and thus generates the maximum eddy current, $I_E$, in the metal structure 804 and hence the maximum current, $I_{CE}$, opposing the charging current, $I_{RX}$, generated in the primary receive antenna 518. This is the first situation described above with respect to FIG. 7A and FIG. 7B.

A transmit antenna (not shown) having a uniform field will show a wider-than-expected range of electromagnetic coupling when a large metallic receiver having a relatively small primary receive antenna is used. This makes receiver and receive antenna design difficult due to a wide voltage range, and/or a receiver that cannot accept charge, or that can accept a reduced charge, at many locations on a wireless charging surface 802. As a result, the overall electromagnetic coupling between the transmit antenna (not shown) and the primary receive antenna 518 is reduced, resulting in a reduction in the voltage available at the receiver 508 (which may result in a voltage too low to be usable) and in an increase in the effective source impedance to a load after the rectifier in the receiver 508, thus possibly reducing available power.

FIGS. 9A, 9B, 9C and 9D are diagrams illustrating an embodiment of a wireless power transfer antenna incorporating a field altering circuit where the field altering circuit is a field concentrator circuit.

FIG. 9A is a diagram illustrating an exemplary transmit pad 902. In an exemplary embodiment, the transmit pad 902 comprises a transmit antenna 903 that comprises antenna coils 904, 906 and 908. The antenna coils 904, 906 and 908 may be individual antenna coils, or may be antenna coil segments of the same antenna coil (e.g., turns of a coil) and may be configured in a variety of shapes and configurations. In an exemplary embodiment, the transmit antenna 903 and the antenna coils 904, 906 and 908 may comprise an embodiment of a transmit antenna 614 (FIG. 6), configured to wirelessly transmit power. In an exemplary embodiment, the transmit antenna 903 and the antenna coils 904, 906 and 908 may receive a power transfer signal from the transmit circuitry 406 of FIG. 4. In an exemplary embodiment, the antenna coil 904 can be configured to receive a current of 1 amp (1 A), the antenna coil 906 can be configured to receive a current of 4 A, and the antenna coil 908 can be configured to receive a current of 9 A. The current delivered to each antenna coil 904, 906 and 908 is proportional to the area enclosed by each coil, so in this example, providing 1 A, 4 A and 9 A, to the antenna coils 904, 906 and 908, respectively, produces a relatively even H-field, also referred to as a wireless charging field, over the surface of the transmit pad 902, such as the H-field shown in FIG. 7A. In certain cases, when the antenna coils 904, 906, and 908 are configured as different turns of a coil structure, the even H-field may be a function of the shape and configuration/positioning of the coils. For example, while driven with the same current, the spacing between turns and other positioning may be achieve a desired field distribution such as being substantially uniform field or having one or more peaks or valleys.

In an exemplary embodiment, the transmit pad 902 includes an additional circuit 910. In an exemplary embodiment, the circuit 910 can be referred to as a field altering circuit or field altering coil, and, in an exemplary embodiment, can be a field concentrator circuit. Although the circuit 910 is illustrated as being located generally between the antenna coil 904 and the antenna coil 906, the circuit 910, and the various embodiments of field altering circuits described herein, can be located elsewhere relative to the antenna coils 904, 906 and 908. In an exemplary embodiment, the circuit 910 may be at least partially enclosed by the transmit antenna 903. Generally, the circuit 910 is located in an area of the transmit pad 902 where it is desired to alter the H-field produced by the transmit pad 902.

FIG. 9B is a diagram illustrating the concentrator circuit 910 of FIG. 9A in further detail. In an exemplary embodiment, the concentrator circuit 910 comprises a coil 912, a capacitor 914 and a switch 916. In an exemplary embodiment, the switch 916 can be controlled by a signal from the transmit circuitry 406. The concentrator circuit 910 can be used to selectively alter the H-field produced by the transmit pad 902 to allow both small devices to be charged and to allow large devices having small resonators with metal plates or covers to be charged. While shown schematically as having a single loop coil, the concentrator circuit 910 can also comprise a multi-turn shaped resonator.

FIG. 9C is a diagram illustrating the H-field of the transmit pad 902 when the concentrator circuit 910 is switched off, or open. The vertical axis 922 shows the relative magnitude of an H-field produced by the power transmit antenna associated with the transmit pad 902, and the horizontal axis 924 shows the distance, x, across the transmit pad 902. The trace 925 shows the relative magnitude of the H-field produced by the transmit pad 902. The shape of the trace 925 gives rise to a "charge area" 926 that covers the surface of the transmit pad 902. When the switch 916 is open the concentrator circuit 910 is open and is "invisible" to the H-field such that in this state the H-field is unaffected by the concentrator circuit 910 and remains uniform. In this state, a small less-robust device can be located anywhere on the surface of the transmit pad 902 and receive a charge without overloading the device.

FIG. 9D is a diagram illustrating the H-field of the transmit pad 902 when the concentrator circuit 910 is switched on, or in a resonant state. The resonant frequency of the concentrator circuit 910 can be defined by the value of the capacitor 914, which can be chosen based on desired operating characteristics. The vertical axis 932 shows the relative magnitude of an H-field produced by the power transmit antenna associated with the transmit pad 902, and the horizontal axis 934 shows the distance, x, across the transmit pad 902. The trace 935 shows the relative magnitude of the H-field produced by the transmit pad 902, and includes a peak 937. The shape of the trace 935 gives rise to a "charge area" 936 that covers the surface of the transmit pad 902. When the switch 916 is closed, the capacitor 914 causes the concentrator circuit 910 to become resonant, amplifying the field passing through it, and generating the peak 937 in the trace 935. In this state, a device having a small resonator coil and a large metal plate or cover can be located anywhere on the surface of the transmit pad 902 and receive an adequate charge.

The concentrator circuit 910 can be implemented as a resonant loop, as a separately powered loop that can be designed to provide additional H-field strength in its center, or as a close-to-resonant loop that can be configured to amplify the H-field and also make the resonator load more reactive (as seen by the driving circuit 424 (FIG. 4)). This can compensate for the common problem of a large metal plate making the resonator load more capacitive.

Since it is typically desired that the transmit resonator produce a uniform field most of the time, the concentrator circuit 910 will usually be turned off, under control of the transmit circuitry 406. The concentrator circuit 910 can be turned on when a large metal-backed or metal-cased device is placed on the transmit pad 902. The activation of the concentrator circuit 910, and the other embodiments of the field altering circuits described herein, can occur as a result of the device to be charged identifying itself to the transmitter 404 as a large device. Alternatively, the concentrator circuit 910 can be activated as a result of the charge-receiving device being unable to reach an adequate voltage for charging (and no other devices are on the pad), or a combination of the two. As such, in accordance with an exemplary embodiment, the transmit circuitry 406 can be configured to detect a need to change the field distribution of a charging area via a field altering circuit, e.g., the concentrator circuit 910. The transmit circuitry 406 activates or de-activates operation of the field altering circuit in response to detecting the need to change the field distribution from the substantially uniform magnetic field distribution (FIG. 9C) to a magnetic field distribution (FIG. 9D) that is less uniform than the magnetic field distribution when the concentrator circuit 910 is not activated. For example, as just described, the transmit circuitry 406 can detect the type of chargeable device(s) (e.g., a large device or a device with a certain amount of metal) via receiving information for the device or detecting insufficient power transfer. In response the transmit circuitry 406 controls operation of the field altering circuit to modify the field distribution toward the center of the charge area 936.

FIGS. 10A, 10B, 10C and 10D are diagrams illustrating an embodiment of a wireless power transfer antenna incorporating a field altering circuit where the field altering circuit is a field attenuator coil.

FIG. 10A is a diagram illustrating an exemplary transmit pad 1002. In an exemplary embodiment, the transmit pad 1002 comprises a transmit antenna 1003 that comprises antenna coils 1004, 1006 and 1008. The antenna coils 1004, 1006 and 1008 may be individual antenna coils, or may be antenna coil segments of the same antenna coil. In an exemplary embodiment, the transmit antenna 1003 and the antenna coils 1004, 1006 and 1008 may comprise an embodiment of a transmit antenna 614 (FIG. 6), configured to wirelessly transmit power. In an exemplary embodiment, the transmit antenna 1003 and the antenna coils 1004, 1006 and 1008 may receive a power transfer signal from the transmit circuitry 406 of FIG. 4. In an exemplary embodiment, the antenna coil 1004 can be configured to receive a current of 2 amp (2 A), the antenna coil 1006 can be configured to receive a current of 4 A, and the antenna coil 1008 can be configured to receive a current of 9 A. The current delivered to each antenna coil 1004, 1006 and 1008 is proportional to the area enclosed by each coil, so in this example, providing 2 A, 4 A and 9 A, to the antenna coils 1004, 1006 and 1008, respectively, produces an H-field having a peak over the surface of the transmit pad 902 in the vicinity of the antenna coil 1004, such as the H-field shown in FIG. 7B.

In an exemplary embodiment, the transmit pad 1002 comprises a circuit 1010. In an exemplary embodiment, the circuit 1010 can be referred to as a field altering circuit or field altering coil, and, in an exemplary embodiment, can be referred to as a field attenuator circuit. Although the circuit 1010 is illustrated as being located generally between the antenna coil 1004 and the antenna coil 1006, the circuit 1010, and the various embodiments of field altering circuits described herein, can be located elsewhere relative to the antenna coils 1004, 1006 and 1008. Generally, the circuit 1010 is located in an area of the transmit pad 1002 where it is desired to alter the H-field produced by the transmit pad 1002.

FIG. 10B is a diagram illustrating the attenuator circuit 1010 of FIG. 10A in further detail. In an exemplary embodiment, the attenuator circuit 1010 comprises a coil 1012 and a switch 1016. In an exemplary embodiment, the switch 1016 can be controlled by a signal from the transmit circuitry 406. The attenuator circuit 1010 can be used to selectively alter the H-field produced by the transmit pad 1002 to allow both small devices to be charged and to allow large devices having small resonators and metal plates or covers to be charged. While shown schematically as having a single loop, the attenuator circuit 1010 can also comprise a multi-turn shaped resonator.

FIG. 10C is a diagram illustrating the H-field of the transmit pad 1002 when the attenuator circuit 1010 is switched off, or open. The vertical axis 1022 shows the relative magnitude of an H-field produced by the power transmit antenna associated with the transmit pad 1002, and the horizontal axis 1024 shows the distance, x, across the transmit pad 1002. The trace 1025 shows the relative magnitude of the H-field produced by the transmit pad 902 and includes a peak 1027. The shape of the trace 1025 gives rise to a "charge area" 1026 that covers the surface of the transmit pad 1002. When the switch 1016 is open the attenuator circuit 1010 is open and is "invisible" to the H-field such that in this state the peak 1027 in the H-field remains. In this state, a device having a small resonator coil and a large metal plate or case can be located anywhere on the surface of the transmit pad 1002 and receive an adequate charge.

FIG. 10D is a diagram illustrating the H-field of the transmit pad 1002 when the attenuator circuit 1010 is switched on, or in a shorted or short circuit state. The vertical axis 1032 shows the relative magnitude of an H-field produced by the power transmit antenna associated with the transmit pad 1002, and the horizontal axis 1034 shows the distance, x, across the transmit pad 1002. The trace 1035 shows the relative magnitude of the H-field produced by the transmit pad 1002, and includes a region 1037, where the peak 1027 (FIG. 10C) has been attenuated as a result of the shorting of the attenuator circuit 1010. The shape of the trace 1035 gives rise to a "charge area" 1036 that covers the surface of the transmit pad 1002. When the switch 1016 is closed, the attenuator circuit 1010 becomes shorted, thus attenuating the field passing through it, and substantially eliminating the peak 1027 (FIG. 10C) from the trace 1035. The region 1037 while not completely even, is substantially more even than the trace 1025, thus allowing a small less-robust device to be located anywhere on the surface of the transmit pad 1002 and receive a charge without overloading the device. The attenuator circuit 1010 can be implemented as a shorting coil that "shorts" a portion of the H-field, thus attenuating the H-field in that area. The transmit circuitry 406 activates or de-activates operation of the field altering circuit in response to detecting the need to change the field distribution from the substantially non-uniform magnetic field distribution (FIG. 10C) to a magnetic field distribution (FIG. 10D) that is more uniform than the magnetic field distribution when the attenuator circuit 1010 is not activated In an embodiment in which it is desired that the transmit resonator produce a non-uniform field most of the time, the attenuator circuit 1010 will usually be turned off, under control of the transmit circuitry 406. The attenuator circuit 1010 can be turned on when a small device is placed on the transmit pad 1002. The activation of the attenuator circuit 1010 can occur as a result of the device to be charged identifying itself to the transmitter 404 as a small device. Alternatively, the attenuator circuit 1010 can be usually turned on, resulting in a relatively even distribution of H-field. This allows most small devices to be charged normally. The attenuator circuit 1010 can be turned off when a device having a small resonator coil and a large metal plate is placed on the transmit pad 1002. This allows the device to receive a normal charge anywhere on the pad.

FIGS. 11A, 11B, 11C, 11D and 11E are diagrams illustrating an alternative embodiment of a wireless power transfer antenna incorporating a field altering circuit, where the field altering circuit can be a field concentrator circuit or a field attenuator circuit.

Figure 11A:
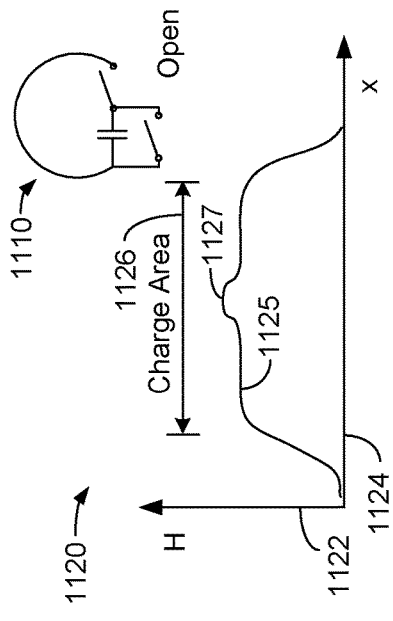
FIGS. 11A, 11B, 11C, 11D and 11E are diagrams illustrating an alternative embodiment of a wireless power transfer antenna incorporating a field altering circuit, where the field altering circuit can be a field concentrator circuit or a field attenuator circuit.

FIG. 11A is a diagram illustrating an exemplary transmit pad 1102. In an exemplary embodiment, the transmit pad 1102 comprises a transmit antenna 1103 that comprises antenna coils 1104, 1106 and 1108. The antenna coils 1104, 1106 and 1108 may be individual antenna coils, or may be antenna coil segments of the same antenna coil. In an exemplary embodiment, the transmit antenna 1103 and the antenna coils 1104, 1106 and 1108 may comprise an embodiment of a transmit antenna 614 (FIG. 6), configured to wirelessly transmit power. In an exemplary embodiment, the transmit antenna 1103 and the antenna coils 1104, 1106 and 1108 may receive a power transfer signal from the transmit circuitry 406 of FIG. 4. In an exemplary embodiment, the antenna coil 1104 can be configured to receive a current of 1.5 amp (1.5 A), the antenna coil 1106 can be configured to receive a current of 4 A, and the antenna coil 1108 can be configured to receive a current of 9 A. The current delivered to each antenna coil 1104, 1106 and 1108 is proportional to the area enclosed by each coil, so in this example, providing 1.5 A, 4 A and 9 A, to the antenna coils 1104, 1106 and 1108, respectively, produces an H-field having a modest peak over the surface of the transmit pad 1102, with the peak being smaller than the peak shown in the H-field of FIG. 7B or FIG. 10C.

In an exemplary embodiment, the transmit pad 1102 comprises a circuit 1110. In an exemplary embodiment, the circuit 1110 can be referred to as a field altering circuit, and, in an exemplary embodiment, can be referred to as a combination field altering circuit in that it can be configured to operate as a field concentrator circuit or as a field attenuator circuit. Although the circuit 1110 is illustrated as being located generally between the antenna coil 1104 and the antenna coil 1106, the circuit 1110, and the various embodiments of field altering circuits described herein, can be located elsewhere relative to the antenna coils 1104, 1106 and 1108. Generally, the circuit 1110 is located in an area of the transmit pad 1102 where it is desired to alter the H-field produced by the transmit pad 1102.

Figure 11B:
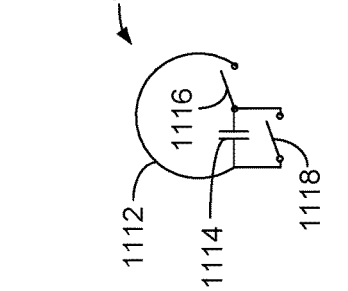

FIG. 11B is a diagram illustrating the combination circuit 1110 of FIG. 11A in further detail. In an exemplary embodiment, the combination field altering circuit 1110 comprises a coil 1112, a capacitor 1114, a switch 1116, and a switch 1118. In an exemplary embodiment, the switch 1116 and the switch 1118 can be controlled by respective control signals from the transmit circuitry 406. The combination field altering circuit 1110 can be used to selectively alter the H-field produced by the transmit pad 1102 to allow both small devices to be charged and to allow large devices having small resonators and metal plates or covers to be charged. While shown schematically as a single loop, the combination field altering circuit 1110 can also comprise a multi-turn shaped resonator. In an exemplary embodiment, when the switch 1116 and the switch 1118 are both open, the combination field altering circuit 1110 is open and has no effect on the H-field produced by the transmit pad 1102. When the switch 1116 is closed and the switch 1118 is open, the combination field altering circuit 1110 is placed in a resonant state and can be used to amplify or enhance the H-field generated by the transmit pad 1102 in the vicinity of the combination field altering circuit 1110. The resonant frequency of the combination field altering circuit 1110 can be defined by the value of the capacitor 1114, which can be chosen based on desired operating characteristics. When the switch 1116 is closed and the switch 1118 is closed, the combination field altering circuit 1110 is shorted and can be configured to attenuate the H-field generated by the transmit pad 1102 in the vicinity of the combination field altering circuit 1110.

Figure 11C:
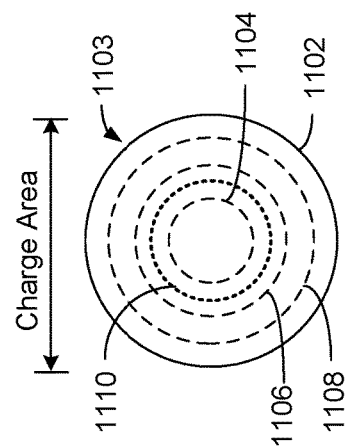

FIG. 11C is a diagram illustrating the H-field of the transmit pad 1102 when the combination field altering circuit 1110 is switched off, or open. The vertical axis 1122 shows the relative magnitude of an H-field produced by the power transmit antenna associated with the transmit pad 1102, and the horizontal axis 1124 shows the distance, x, across the transmit pad 1102. The trace 1125 shows the relative magnitude of the H-field produced by the transmit pad 1102 and includes a peak 1127. The peak 1127 is defined by the current provided to the antenna coils 1104, 1106 and 1108, and by the amount of area enclosed by the antenna coils 1104, 1106 and 1108. The shape of the trace 1125 gives rise to a "charge area" 1126 that covers the surface of the transmit pad 1102. When the switch 1116 is open and the switch 1118 is open the combination field altering circuit 1110 is open and is "invisible" to the H-field such that in this state the H-field remains slightly peaked as shown in FIG. 11C. In this state, a relatively robust small device, or a device having a small resonator and a small metal plate or case, can be located anywhere on the surface of the transmit pad 1102 and receive an adequate charge.

Figure 11D:
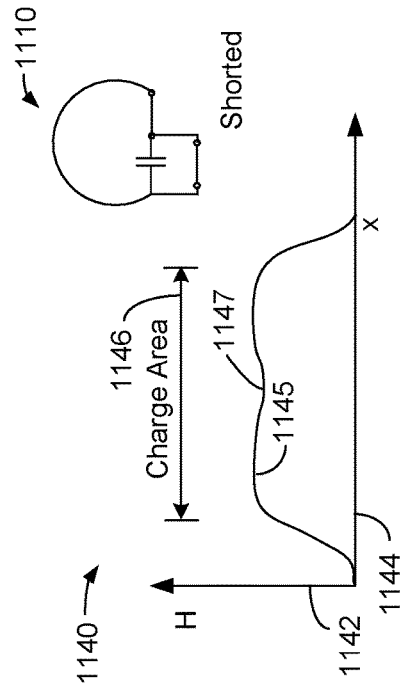

FIG. 11D is a diagram illustrating the H-field of the transmit pad 1102 when the combination field altering circuit 1110 is switched to be in a resonant state. The vertical axis 1132 shows the relative magnitude of an H-field produced by the power transmit antenna associated with the transmit pad 1102, and the horizontal axis 1134 shows the distance, x, across the transmit pad 1102. The trace 1135 shows the relative magnitude of the H-field produced by the transmit pad 1102 and includes a peak 1137. The shape of the trace 1135 gives rise to a "charge area" 1136 that covers the surface of the transmit pad 1102. When the switch 1116 is closed and the switch 1118 is open the combination field altering circuit 1110 is in a resonant state and can affect the H-field such that in this state the peak 1127 (FIG. 11C) in the H-field is enhanced or amplified resulting in a peak 1137 that is larger than the peak 1127 (FIG. 11C). In this state, a device having a small resonator coil and a large metal plate or case can be located anywhere on the surface of the transmit pad 1102 and receive an adequate charge.

Figure 11E:
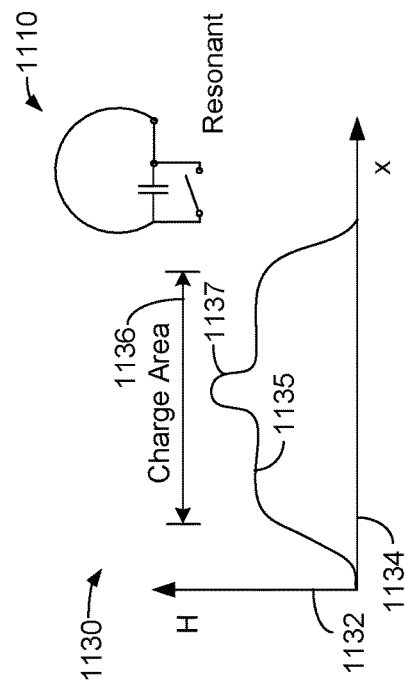

FIG. 11E is a diagram illustrating the H-field of the transmit pad 1102 when the combination field altering circuit 1110 is switched to be in a shorted state. The vertical axis 1142 shows the relative magnitude of an H-field produced by the power transmit antenna associated with the transmit pad 1102, and the horizontal axis 1144 shows the distance, x, across the transmit pad 1102. The trace 1145 shows the relative magnitude of the H-field produced by the transmit pad 1102 and includes a region 1147, where the peak 1127 (FIG. 11C) has been attenuated as a result of the shorting of the field altering circuit 1110. The shape of the trace 1145 gives rise to a "charge area" 1146 that covers the surface of the transmit pad 1102. When the switch 1116 is closed and the switch 1118 is closed the combination field altering circuit 1110 is shorted and can affect the H-field such that in this state the peak 1127 (FIG. 11C) in the H-field is attenuated resulting in a relatively even H-field. In this state, a small less-robust device can be located anywhere on the surface of the transmit pad 1102 and receive a charge without overloading the device.

FIGS. 12A, 12B, 12C and 12D are diagrams illustrating an alternative embodiment of a wireless power transfer antenna incorporating a field altering circuit, where the field altering circuit can be a field concentrator circuit.

FIG. 12A is a diagram illustrating a wireless power transfer system 1200 having an exemplary transmit pad 1202. In an exemplary embodiment, the transmit pad 1202 comprises a transmit antenna 1203 that comprises three windings of antenna coil segments 1204, 1206 and 1208 (e.g., turns). In an exemplary embodiment, the transmit antenna 1203, and the antenna coil segments 1204, 1206 and 1208 may comprise an embodiment of a transmit antenna 614 (FIG. 6), configured to wirelessly transmit power. Furthermore, the configuration/position of the coil segments 1204, 1206, 1208 further provide one illustrative example of a possible configuration/position of the coil segments shown in FIGS. 9A, 10A, and 11A. In an exemplary embodiment, the transmit antenna 1203 may receive a power transfer signal from the transmit circuitry 406 of FIG. 4. In an exemplary embodiment, the antenna coil segments 1204, 1206 and 1208 can be configured to develop a relatively even H-field over the surface of the transmit pad 1202, such as the H-field shown in FIG. 7A and FIG. 12B. In this embodiment, the antenna coil segments 1204, 1206 and 1208 create an even field by clustering two of the antenna coil segments 1206 and 1208 near the edge, or periphery, of the transmit pad 1202, and having the third antenna coil segment 1204 spaced widely from them toward the center of the transmit pad 1202. This has the effect of increasing current concentration in the edge of the resonator even though all segments carry the same current, as opposed to an evenly spaced resonator with a greater current in the outermost resonator.

The transmit antenna 1203 also comprises a circuit 1210 associated with the innermost coil segment 1204. In an exemplary embodiment, the circuit 1210 comprises a capacitor 1214 and a switch 1216. In an exemplary embodiment, the switch 1216 can be controlled by a signal from the transmit circuitry 406. The circuit 1210 can be controlled to cause the innermost coil segment 1204 to operate in a resonant state, thereby operating as a concentrator coil that can be used to selectively alter the H-field produced by the transmit pad 1202 to allow both small devices to be charged and to allow large devices having small resonators and metal plates to be charged. The resonant frequency of the circuit 1210 can be defined by the value of the capacitor 1214, which can be chosen based on desired operating characteristics. Although shown as being associated with the innermost antenna coil segment 1204, the circuit 1210, and the various embodiments of field altering circuits and coil segments described herein, can be located elsewhere relative to the antenna coil segments 1204, 1206 and 1208. Generally, the circuit 1210 is associated with an antenna coil or antenna coil segment located in an area of the transmit pad 1202 where it is desired to alter the H-field produced by the transmit pad 1202.

FIG. 12B is a diagram illustrating the H-field of the transmit pad 1202 when the circuit 1210 is switched off, or open. The vertical axis 1222 shows the relative magnitude of an H-field produced by the transmit antenna 1203 associated with the transmit pad 1202, and the horizontal axis 1224 shows the distance, x, across the transmit pad 1202. The trace 1225 shows the relative magnitude of the H-field produced by the transmit pad 1202. The shape of the trace 1225 gives rise to a "charge area" 1226 that covers the surface of the transmit pad 1202. When the switch 1216 is open the innermost coil segment 1204 operates normally (is not in a resonant state), such that in this state the H-field remains uniform as shown in FIG. 12B. In this state, a small device can be located anywhere on the surface of the transmit pad 1202 and receive a charge without overloading the device.

FIG. 12C is a diagram illustrating a wireless power transfer system 1230 having an exemplary transmit pad 1232. In an exemplary embodiment, the transmit pad 1232 comprises a transmit antenna 1233 that comprises three windings of antenna coil segments 1234, 1236 and 1238. In an exemplary embodiment, the transmit antenna 1233, and the antenna coil segments 1234, 1236 and 1238 may comprise an embodiment of a transmit antenna 614 (FIG. 6), configured to wirelessly transmit power. In an exemplary embodiment, the transmit antenna 1233 may receive a power transfer signal from the transmit circuitry 406 of FIG. 4.

In the embodiment shown in FIG. 12C, the switch 1216 of the circuit 1210 is closed, thereby causing the innermost coil segment 1234 to operate in a resonant state, thereby causing the innermost coil segment 1234 to operate as a concentrator coil that can be used to selectively alter the H-field produced by the transmit pad 1232 to allow large devices having small resonators and metal plates or covers to be charged.

FIG. 12D is a diagram illustrating the H-field of the transmit pad 1232 when the circuit 1210 is switched on, or closed. The vertical axis 1242 shows the relative magnitude of an H-field produced by the transmit antenna 1233 associated with the transmit pad 1232, and the horizontal axis 1244 shows the distance, x, across the transmit pad 1232. The trace 1245 shows the relative magnitude of the H-field produced by the transmit pad 1232. The shape of the trace 1245 gives rise to a "charge area" 1246 that covers the surface of the transmit pad 1232. The trace 1245 includes a peak 1247, caused by the innermost coil segment 1234 operating in a resonant state and amplifying the H-field of the transmit antenna 1233 in the vicinity of the innermost coil segment 1234. When the switch 1216 is closed the innermost coil segment 1234 operates in a resonant state, such that in this resonant state the H-field in the vicinity of the innermost coil segment 1234 is amplified, evidenced by the peak 1247 in the trace 1245. This allows a device having a small resonator coil and a large metal plate or case to be located anywhere on the surface of the transmit pad 1232 and receive an adequate charge.

FIGS. 13A, 13B, 13C and 13D are diagrams illustrating an alternative embodiment of a wireless power transfer antenna incorporating a field altering circuit, where the field altering circuit can be a field attenuator circuit.

FIG. 13A is a diagram illustrating a wireless power transfer system 1300 having an exemplary transmit pad 1302. In an exemplary embodiment, the transmit pad 1302 comprises a transmit antenna 1303 that comprises three windings of antenna coil segments 1304, 1306 and 1308. In an exemplary embodiment, the transmit antenna 1303, and the antenna coil segments 1304, 1306 and 1308 may comprise an embodiment of a transmit antenna 614 (FIG. 6), configured to wirelessly transmit power. In an exemplary embodiment, the transmit antenna 1303 may receive a power transfer signal from the transmit circuitry 406 of FIG. 4. In an exemplary embodiment, the antenna coil segments 1304, 1306 and 1308 can be configured to develop an H-field having a peak over the surface of the transmit pad 1302, such as the H-field shown in FIG. 7B and FIG. 13B.

In this embodiment, the antenna coil segments 1304, 1306 and 1308 create an even field by clustering two of the antenna coil segments 1306 and 1308 near the edge of the transmit pad 1302, and having the third antenna coil segment 1304 spaced widely from them in the center of the transmit pad 1302. This has the effect of increasing current concentration in the edge of the resonator even though all segments carry the same current, as opposed to an evenly spaced resonator with a greater current in the outermost resonator.

The transmit antenna 1303 also comprises a circuit 1310 associated with the innermost coil segment 1304. In an exemplary embodiment, the circuit 1310 comprises a switch 1316. In an exemplary embodiment, the switch 1316 can be controlled by a signal from the transmit circuitry 406. The circuit 1310 can be controlled to selectively cause the innermost coil segment 1304 to operate in a shorted state, thereby operating as an attenuator circuit that can be used to selectively alter the H-field produced by the transmit pad 1302 to allow both small devices to be charged and to allow large devices having small resonators and metal plates to be charged. Although shown as being associated with the innermost antenna coil segment 1304, the circuit 1310, and the various embodiments of field altering circuits described herein, can be located elsewhere relative to the antenna coil segments 1304, 1306 and 1308. Generally, the circuit 1310 is associated with an antenna coil or antenna coil segment located in an area of the transmit pad 1302 where it is desired to alter the H-field produced by the transmit pad 1302.

FIG. 13B is a diagram illustrating the H-field of the transmit pad 1302 when the circuit 1310 is switched off, or open. The vertical axis 1322 shows the relative magnitude of an H-field produced by the transmit antenna 1303 associated with the transmit pad 1302, and the horizontal axis 1324 shows the distance, x, across the transmit pad 1302. The trace 1325 shows the relative magnitude of the H-field produced by the transmit pad 1302 and includes a peak 1327. The shape of the trace 1325 gives rise to a "charge area" 1326 that covers the surface of the transmit pad 1302. When the switch 1316 is open the innermost coil segment 1304 operates normally (is not in a shorted state), such that in this state the H-field remains as shown in FIG. 13B. In this state, a device having a small resonator coil and a large metal plate or cover can be located anywhere on the surface of the transmit pad 1302 and receive an adequate charge.

FIG. 13C is a diagram illustrating an exemplary transmit pad 1332. In an exemplary embodiment, the transmit pad 1332 comprises a transmit antenna 1333 that comprises three windings of antenna coil segments 1334, 1336 and 1338. In an exemplary embodiment, the transmit antenna 1333, and the antenna coil segments 1334, 1336 and 1338 may comprise an embodiment of a transmit antenna 614 (FIG. 6), configured to wirelessly transmit power. In an exemplary embodiment, the transmit antenna 1333 may receive a power transfer signal from the transmit circuitry 406 of FIG. 4.

In the embodiment shown in FIG. 13C, the switch 1316 of the circuit 1310 is closed, thereby causing the innermost coil segment 1334 to operate in a shorted state, thereby operating as an attenuator circuit that can be used to selectively alter the H-field produced by the transmit pad 1332 to allow a small less-robust device to be located anywhere on the surface of the transmit pad 1332 and receive a charge without overloading the device.

FIG. 13D is a diagram illustrating the H-field of the transmit pad 1332 when the circuit 1310 is switched on, or closed. The vertical axis 1342 shows the relative strength of an H-field produced by the transmit antenna 1333 associated with the transmit pad 1332, and the horizontal axis 1344 shows the distance, x, across the transmit pad 1332. The trace 1345 shows the relative magnitude of the H-field produced by the transmit pad 1332, and includes a region 1347 having an attenuated profile, where the peak 1327 (FIG. 13B) has been attenuated as a result of the shorting of the innermost coil segment 1334. The shape of the trace 1345 gives rise to a "charge area" 1346 that covers the surface of the transmit pad 1332. When the switch 1316 is closed the innermost coil segment 1334 operates in a shorted state, such that in this shorted state the H-field in the vicinity of the innermost coil segment 1334 is attenuated, evidenced by the region 1347 in the trace 1345. This allows a small less-robust device to be located anywhere on the surface of the transmit pad 1332 and receive a charge without overloading the device.

In an exemplary embodiment, the controller 415 (FIG. 4) may be operably coupled to any of the field altering circuits described herein and can be configured to detect a characteristic of one or more receiver devices and operably activate or de-activate the field altering circuit to alter the magnetic field to alter the magnetic field distribution and control the field altering circuit to alter the magnetic field distribution in response to the detected characteristic.

In another exemplary embodiment, the controller 415 (FIG. 4) may be operably coupled to any of the field altering circuits described herein and can be configured to detect a characteristic of one or more receiver devices indicative of an amount or efficiency of wirelessly coupling charging power via the magnetic field generated by the transmitter, and alter the magnetic field to alter the magnetic field distribution within the charging region in response to detecting the characteristic.

In another exemplary embodiment, the controller 415 (FIG. 4) may be operably coupled to any of the field altering circuits described herein and can be configured to control the field altering circuit to operate in a first mode to alter the magnetic field corresponding to a first magnetic field distribution and a second mode corresponding to a second, different, magnetic field distribution, the controller further configured to control the field altering circuit between the first mode and the second mode based on a detected characteristic of the one or more receiver devices.

In an exemplary embodiment, detecting a characteristic of a receiver device may include, for example, detecting a reactance shift at the transmit antenna caused by a receiver device. For example, the controller 415 can monitor a reactance parameter, such as the reactance at the transmit antenna 414. The reactance shift at the transmit antenna 414 can be indicative of the presence of a metal or metallic object on the charging surface, such as a receiver. Detecting a change at the transmit antenna 414 may comprise detecting a change in impedance, which can be used to detect a change in resistance and/or reactance. Both resistance and reactance can be measured directly. Resistance can also be measured indirectly by measuring voltage. For example, in the case where a pure current source is driving the transmit antenna 414, then a voltage change at the transmit antenna 414 will be observed.

In an exemplary embodiment, the characteristic to be detected may include detecting at least one of a number of receiver devices present in the charging region at a given point in time, or an amount of power being received by the one or more receiver devices, or an amount of coupling between the transmitter and the one or more receiver devices, or a power requirement of the one or more receiver devices, or an amount of metal within the one or more receiver devices, or a size of the one or more receiver devices, or any combination thereof.

In an exemplary embodiment, altering the magnetic field to alter the magnetic field distribution may include altering the magnetic field corresponding to a first magnetic field distribution or altering the magnetic field corresponding to a second magnetic field distribution, where the second magnetic field distribution may be different from the first magnetic field distribution. In an exemplary embodiment, the first magnetic field distribution may correspond to a substantially uniform field distribution over the charging area and the second magnetic field distribution may correspond to a magnetic field distribution where a central portion of the charging area has a magnetic field with a magnitude higher than an outer portion outside the central portion.

In another exemplary embodiment, the embodiments of the transmit pads described herein may have or be part of a housing having a surface configured for direct or indirect placement of one or more receiver devices, the surface defining a charging region for wirelessly charging the one or more receiver devices.

Figure 14:
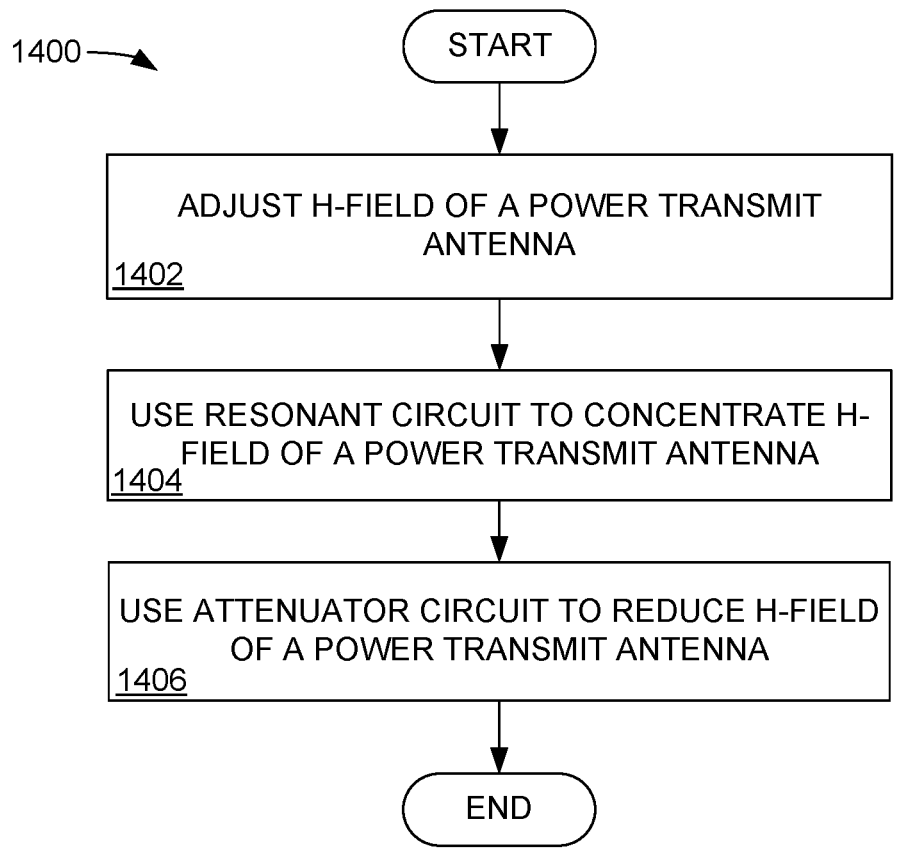
FIG. 14 is a flowchart illustrating an exemplary embodiment of a method for altering a wireless charging field.

FIG. 14 is a flowchart illustrating an exemplary embodiment of a method for altering a wireless charging field. The blocks in the method 1400 can be performed in or out of the order shown. The description of the method 1400 will relate to all of the embodiments described herein.

In block 1402, the H-field of a power transmit antenna is adjusted.

In block 1404, the H-field of a power transmit antenna is concentrated, or amplified by selectively switching a circuit into a resonant state.

In block 1406, the H-field of a power transmit antenna is reduced, or attenuated by selectively switching a circuit into a shorted state. In some embodiments, it may be desirable to perform either the operation in block 1404 or the operation in block 1406, but not necessarily both.

Figure 15:
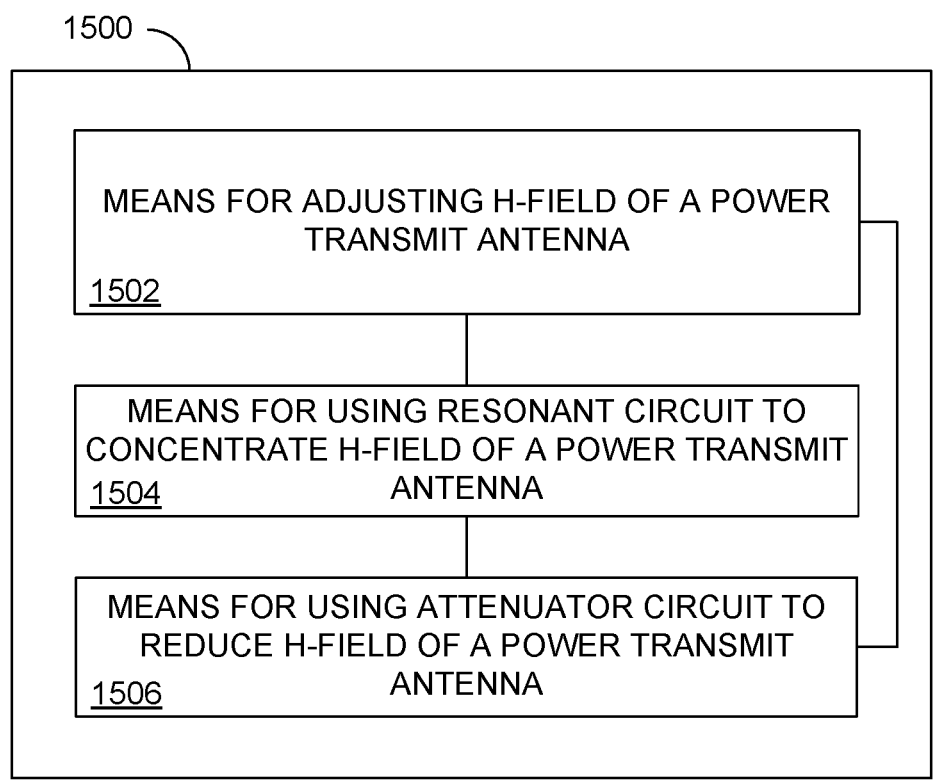
FIG. 15 is a functional block diagram of an apparatus for altering a wireless charging field.

FIG. 15 is a functional block diagram of an apparatus 1500 for altering a wireless charging field. The apparatus 1500 comprises means 1502 for adjusting the H-field of a power transmit antenna. In certain embodiments, the means 1502 for adjusting the H-field of a power transmit antenna can be configured to perform one or more of the function described in operation block 1502 of method 1500 (FIG. 15). In an exemplary embodiment, the means 1502 for adjusting the H-field of a power transmit antenna may comprise the structure shown in one or more of FIGS. 9A, 9B, 9C, 9D, 10A, 10B, 10C, 10D, 11A, 11B, 11C, 11D, 11E, 12A, 12B, 12C, 12D, 13A, 13B, 13C and 13D. The apparatus 1500 further comprises means 1504 for concentrating, or amplifying the H-field of a power transmit antenna. In certain embodiments, the means 1504 for concentrating, or amplifying the H-field of a power transmit antenna can be configured to perform one or more of the function described in operation block 1404 of method 1400 (FIG. 14). In an exemplary embodiment, the means 1504 for concentrating, or amplifying the H-field of a power transmit antenna may comprise the structure shown in one or more of FIGS. 9A, 9B, 9C, 9D, 10A, 10B, 10C, 10D, 11A, 11B, 11C, 11D, 11E, 12A, 12B, 12C, 12D, 13A, 13B, 13C and 13D. The apparatus 1500 further comprises means 1506 for reducing, or attenuating the H-field of a power transmit antenna. In certain embodiments, the means 1506 for reducing, or attenuating the H-field of a power transmit antenna can be configured to perform one or more of the function described in operation block 1406 of method 1400 (FIG. 14). In an exemplary embodiment, the means 1506 for reducing, or attenuating the H-field of a power transmit antenna may comprise the structure shown in one or more of FIGS. 9A, 9B, 9C, 9D, 10A, 10B, 10C, 10D, 11A, 11B, 11C, 11D, 11E, 12A, 12B, 12C, 12D, 13A, 13B, 13C and 13D. In some embodiments, it may be desirable to have only the apparatus in block 1504 or the apparatus in block 1506, but not necessarily both.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A wireless power transmitter for wirelessly coupling charging power to one or more receiver devices, comprising:
a power transmit coil comprising one or more coils or coil turns spaced or positioned to generate a magnetic field having a first magnetic field distribution that is substantially uniform over a surface area defining a near-field charging region in response to a current in the power transmit coil;
a circuit comprising at least one of a portion of a coil turn of the power transmit coil or a second coil different from the one or more coils or coil turns of the power transmit coil, wherein based on a position of the portion of the coil turn or a position of the second coil relative to the power transmit coil, the circuit is configured to alter the magnetic field generated by the power transmit coil to have a second magnetic field distribution over the surface area that has a peak in a center portion of the near-field charging region in response to control of the circuit; and
a controller operably coupled to the circuit, the controller configured to:
detect a characteristic indicative of a size of a receiver device of the one or more receiver devices positioned in the near-field charging region;
control the circuit in a first mode to generate the first magnetic field distribution that is substantially uniform in response to determining the characteristic indicative of the size indicates a first size of the receiver device; and
control the circuit in a second mode to generate the second magnetic field distribution that has the peak in the center portion in response to determining the characteristic indicative of the size indicates a second size of the receiver device, the second size being larger than the first size.

2. The wireless power transmitter of claim 1, wherein the controller is configured to control the circuit in the second mode to selectively amplify the magnetic field to generate the second magnetic field distribution.

3. The wireless power transmitter of claim 2, wherein the circuit is configured to operate as a resonant circuit.

4. The wireless power transmitter of claim 1, wherein the controller is configured to control the circuit in the first mode to selectively attenuate the magnetic field to generate the first magnetic field distribution.

5. The wireless power transmitter of claim 4, wherein the circuit is configured to operate as a short circuit.

6. The wireless power transmitter of claim 1, wherein the power transmit coil comprises a plurality of the one or more coils and the circuit comprises the second coil, wherein the second coil is located adjacent one of the plurality of the one or more coils of the power transmit coil.

7. The wireless power transmitter of claim 1, wherein the power transmit coil comprises the coil turns and the circuit comprises the portion of the coil turn.

8. The wireless power transmitter of claim 1, wherein the power transmit coil comprises the coils turns, wherein the coil turns comprise a first antenna coil segment and a second antenna coil segment arranged at a periphery of the power transmit coil and a third antenna coil segment arranged at the center portion of the power transmit coil and the circuit is connected to the third antenna coil segment, the third antenna coil segment corresponding to the portion of the coil turn.

9. The wireless power transmitter of claim 8, wherein the circuit connected to the third antenna coil segment is configured to, in the second mode, selectively amplify the magnetic field toward the center portion of the power transmit coil.

10. The wireless power transmitter of claim 8, wherein the circuit connected to the third antenna coil segment is configured in the first mode to selectively attenuate the magnetic field toward the center portion of the power transmit coil.

11. A wireless power device, the device comprising:
means for generating a magnetic field over a surface area defining a near-field charging region for wirelessly charging or powering one or more receiver devices, the generating means comprising one or more portions spaced or positioned to generate the magnetic field to have a first magnetic field distribution that is substantially uniform over the surface area defining the near-field charging region in response to a current in the generating means;
means for altering the magnetic field generated by the generating means to have a second magnetic field distribution over the surface area that has a peak in a center portion of the near-field charging region in response to control of the altering means;
means for detecting a characteristic indicative of a size of a receiver device of the one or more receiver devices;
means for controlling the altering means in a first mode to generate the first magnetic field distribution that is substantially uniform in response to determining the characteristic indicative of the size indicates a first size of the receiver device; and
means for controlling the altering means in a second mode to generate the second magnetic field distribution that has the peak in the center portion in response to determining the characteristic indicative of the size indicates a second size of the receiver device, the second size being larger than the first size.

12. The device of claim 11, wherein the altering means comprises means for selectively amplifying the magnetic field in the second mode.

13. The device of claim 12, further comprising means for operating a resonant circuit in a vicinity of the magnetic field.

14. The device of claim 11, wherein the means for altering the magnetic field further comprises means for selectively attenuating the magnetic field in the first mode.

15. The device of claim 14, further comprising means for operating a short circuit in a vicinity of the magnetic field.

16. A method of operating a wireless power transmitter apparatus, the method comprising:
generating, using a power transmit coil, a magnetic field having a first magnetic field distribution that is substantially uniform over a surface area defining a near-field charging region for wirelessly charging or powering one or more receiver devices, the power transmit coil comprising one or more coils or coil turns spaced or positioned to generate the first magnetic field distribution;
detecting a characteristic indicative of a size of a receiver device of the one or more receiver devices;
controlling a circuit to operate in a first mode to generate the first magnetic field distribution that is substantially uniform in response to determining the characteristic indicative of the size indicates a first size of the receiver device, the circuit comprising at least one of a coil turn of the power transmit coil or a second coil different from the one or more coils or coil turns of the power transmit coil; and
controlling the circuit to operate in a second mode to generate a second magnetic field distribution that has a peak in a center portion of the near-field charging region in response to determining the characteristic indicative of the size indicates a second size of the receiver device, the second size being larger than the first size.

17. The method of claim 16, wherein controlling the circuit in the second mode comprises selectively amplifying the magnetic field.

18. The method of claim 17, wherein controlling the circuit in the second mode comprises operating a resonant circuit in a vicinity of the magnetic field.

19. The method of claim 16, wherein controlling the circuit in the first mode comprises selectively attenuating the magnetic field.

20. The method of claim 19, wherein controlling the circuit in the first mode comprises operating a short circuit in a vicinity of the magnetic field.

21. The method of claim 16, wherein detecting the characteristic comprises receiving a message from the receiver device of the one or more receiver devices.

22. The method of claim 16, wherein the characteristic to be detected further comprises at least one of a number of the one or more receiver devices present in the near-field charging region at a given point in time, or an amount of power being received by the one or more receiver devices, or an amount of coupling between the transmitter apparatus and the one or more receiver devices, or a power requirement of the one or more receiver devices, or an amount of metal within the receiver device of the one or more receiver devices.

23. An apparatus for wireless power transfer, comprising:
a housing having a surface configured for direct or indirect placement of one or more receiver devices, the surface defining a surface area having a near-field charging region for wirelessly charging the one or more receiver devices;
a power transmit coil comprising one or more coils or coil turns spaced or positioned to generate a magnetic field having a first magnetic field distribution that is substantially uniform over the surface area of the near-field charging region; and
a circuit comprising at least one of a portion of a coil turn of the power transmit coil or a second coil different from the one or more coils or coil turns of the power transmit coil, wherein based on a position of the portion of the coil turn or a position of the second coil relative to the power transmit coil, the circuit is configured to alter the magnetic field generated by the power transmit coil to have a second magnetic field distribution over the surface area that has a peak in a center portion of the near-field charging region in response to control of the circuit; and
a controller operably coupled to the circuit, the controller configured to:
detect a characteristic indicative of a size of a receiver device of the one or more receiver devices positioned in the near-field charging region;
control the circuit in a first mode to generate the first magnetic field distribution that is substantially uniform in response to determining the characteristic indicative of the size indicates a first size of the receiver device; and
control the circuit in a second mode to generate the second magnetic field distribution that has the peak in the center portion in response to determining the characteristic indicative of the size indicates a second size of the receiver device, the second size being larger than the first size.

24. The apparatus of claim 23, wherein the at least one of the portion of the coil turn or the second coil is at least partially enclosed by the power transmit coil.

* * * * *